US006170643B1

(12) United States Patent

Shah

(10) Patent No.: US 6,170,643 B1
(45) Date of Patent: Jan. 9, 2001

(54) DINING TABLE CONVEYOR

(76) Inventor: Uday N Shah, 230 Little Plains Rd., Huntington, NY (US) 11743

( * ) Notice: Under 35 U.S.C. 154(b), the term of this patent shall be extended for 0 days.

(21) Appl. No.: 09/569,391

(22) Filed: May 12, 2000

(51) Int. Cl.[7] .......................... B65G 17/12; B65G 17/16; B65G 17/32; B65G 17/34; B67D 5/06

(52) U.S. Cl. ................ 198/793; 198/867.1; 198/867.11; 198/867.14; 222/192; 186/49

(58) Field of Search .............................. 222/192; 186/49; 198/243, 867.1, 867.11, 867.14

(56) References Cited

U.S. PATENT DOCUMENTS 3,578,148 * 5/1971 Pickard ............................ 198/181 X
3,953,091 * 4/1976 Shults .............................. 312/223 X

* cited by examiner

*Primary Examiner*—Jospeh E. Valenza
*Assistant Examiner*—K W Bower

(57) ABSTRACT

A dining table top conveyor having a flat base of rectangular/oval shape and flat endless belt guided over two flanged pulleys. One pulley is electrically driven by a variable speed geared motor and other is an idler and belt tensioning pulley. The flat belt has special steel hooks riveted into it, and it engages with a steel bracket on serving bowl holder plates. These plates are made of heat resistant material like cork or heat resistant plastic and move around on top of the table following the belt. On top of these plates are placed the serving bowls containing food items. As the serving bowls/pots go around the table, diners serve themselves as the bowl passes in front of them. Also at each end of the conveyor are two beverage dispensers which can swivel 330 degrees and extend in and out to self serve beverages. Under the table is a beverage container pressurized by a mini-air compressor and a small motor control panel. Also on top of the conveyor are fancy napkin and cutlery holders besides salt and pepper shakers and other condiments holder. The conveyor starts and stops with voice commands or runs continuously selectable to facilitate diners serving patterns.

4 Claims, 6 Drawing Sheets

DINING TABLE CONVEYOR

BACKGROUND OF THE INVENTION

1. Field of the Invention

This invention pertains to conveyors and more particularly to those used in homes and on tops of dining tables for self service of food from serving bowls and self serving of beverages. Also at the same time making maximum use of space and giving diners maximum access to other diners requests like napkins, cutlery, condiments, etc. It is also the intent of the invention to make it a part of the decor for the center piece of the dining table. Present invention is classified under 186/49, Conveyor-Belt Driven.

2. Description of Prior Art

Several conveyors have been designed and used in the past to automate factory operations and commercial food handling, most of these have used storage bins and continuous pathway to guide movement around the conveyor Ref. to U.S. Pat. No. 34,016 to Hankes in December 1990, Ref to U.S. Pat. No. 4,765,440 in August 1988 to Tashman, and U.S. Pat. No. 3,780,852 to Weiss. Also most of those other inventions have been too bulky and too heavy to be used in homes on top of the dining table, besides being too noisy and not compatible to decor in dining room. The present invention besides being light and esthetically enclosed in sound proof housing to reduce motor noise, is very compact and suitable for standard dining tables sold in the market. Also present invention uses tough plastic base unit to match any table decor and standard serving bowls and cutlery. The other main difference in this invention is the elimination of a path way on the table which not only uses up valuable table space, but also interferes with the decor in the dining room. In addition, this invention enables the diners to self serve beverages, food, condiments at will and their own pace. Also this conveyor is voice activated/continuous selectable and with variable speed.

SUMMARY OF THE INVENTION

The present invention is directed towards access of serving bowls and beverages on dining table in homes and hotels to diners. It is the other object of the invention to provide light, esthetic, quiet device, inexpensive to make and maintain by home owners while retaining its effectiveness, using standard dining table, serving bowls, and cutlery. Further objects of the invention will be brought out in the detailed description section.

DETAILED DESCRIPTION OF THE PREFERRED EMBODIMENT

Figure 1:
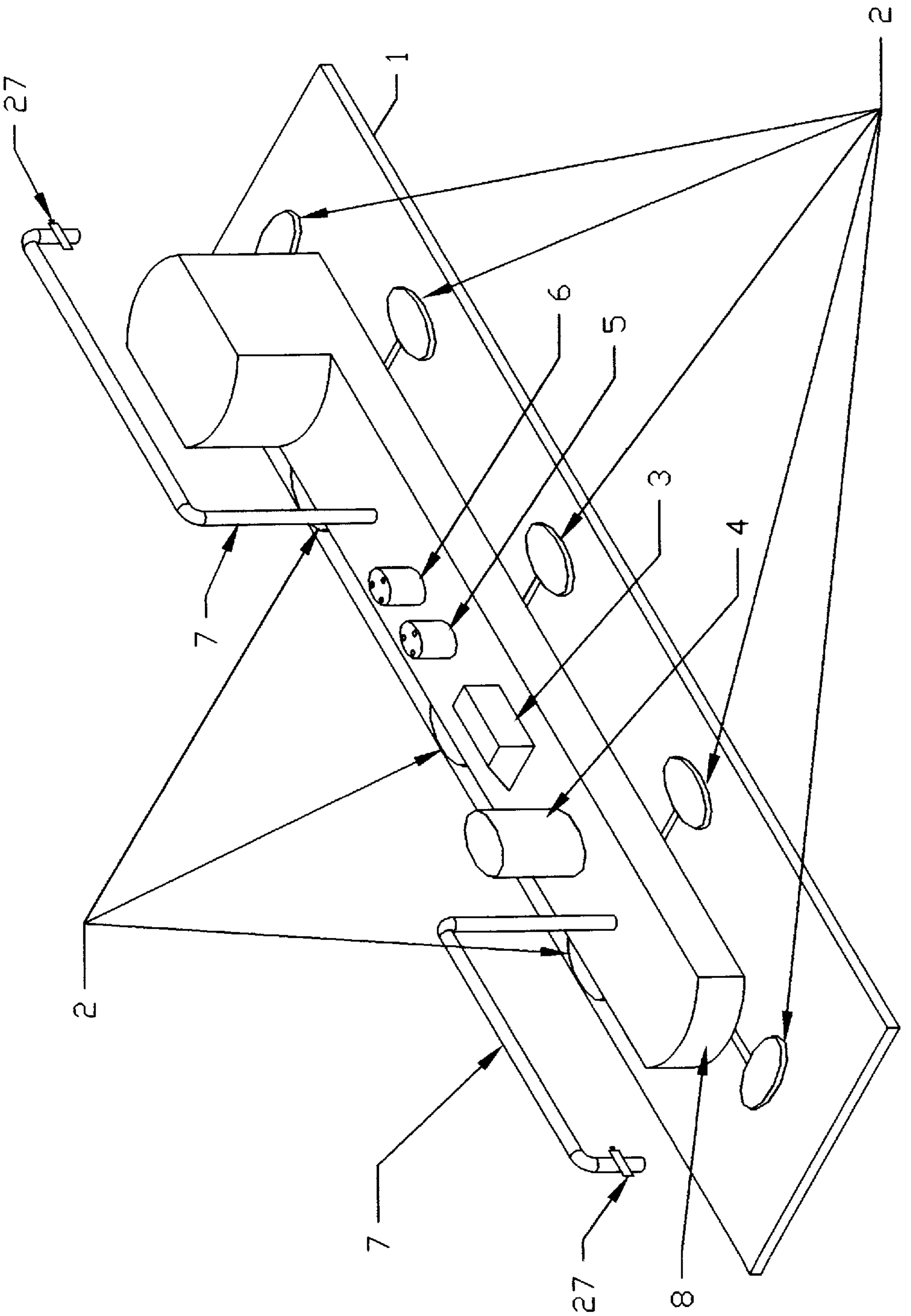
FIG. 1 is perspective view of the present invention.
Figure 2A:
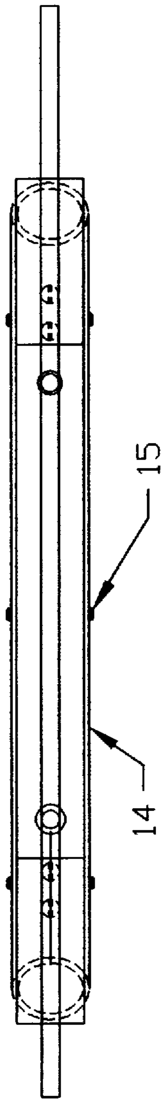
FIG. 2A represents top view of the conveyor assembly without enclosure.
Figure 3A:
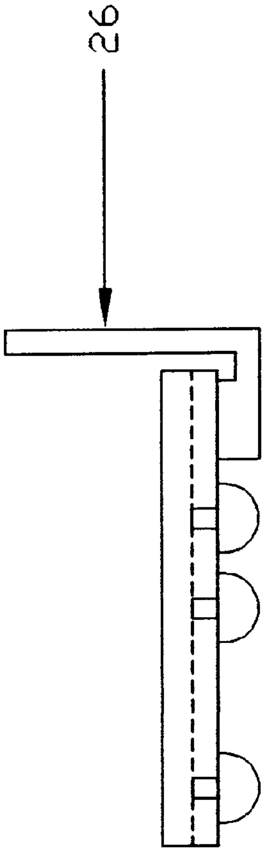
FIG. 3A shows elevations of serving bowl holder plate.

Referring now to FIG. 1 perspective view of the dining table conveyor with beverage dispenser 7, cutlery holder 4, napkin holder 3, condiment holders 5 and 6, and esthetic cover 8 mounted on a thin tough scratch proof smooth plastic sheet 1. Also included are plurality of serving bowl holder plates 2 sliding on sheet 1, driven by flat belt conveyor 14 (FIG. 2A) through hook 15 (FIG. 2A) and bracket 26 (FIG. 3A).

Cover 8 is molded plastic with esthetic designs on outside and sound proof material lining on inside to reduce motor noise. On cover 8 are spots to glue on cutlery holder 4, napkin holder 3, and condiment holders 5 and 6.

Figure 6:
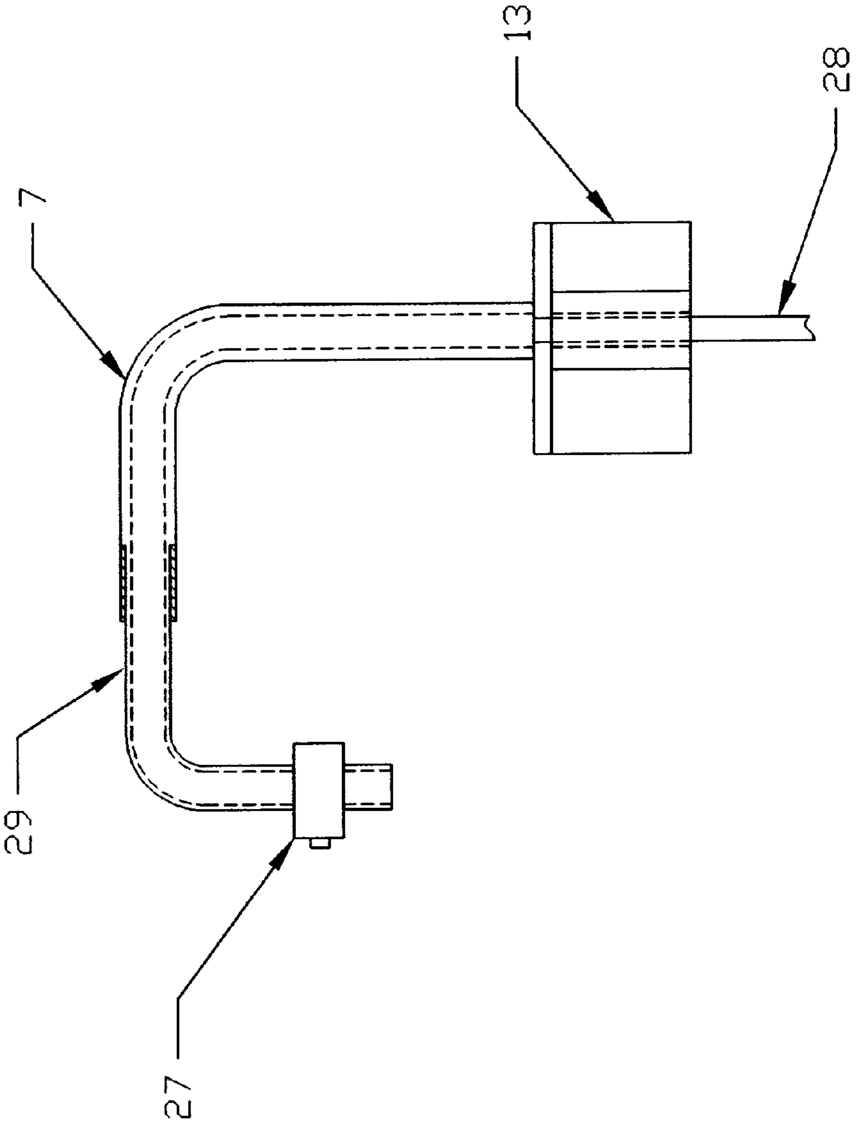
FIG. 6 illustrates elevation of beverage dispenser.

Beverage dispenser 7 has a swivel arm to turn 330 degrees and a telescopic tube 29 (FIG. 6). At the end of the arm is a drip-proof push valve 27 to dispense the beverage. Sliding inside the arm 7 is a food grade plastic pipe 28 (FIG. 6) which goes through the swivel 13 (FIG. 6) to a T junction 16 (FIG. 2) through the dining table to pressurized beverage holding tank 18 (FIG. 2) through tube 17 and valve 21. Beverage holding tank is pressurized by a mini air compressor 19 and controlled by a pressure switch 23. Filters 20 are micron filters to filter any air entering compressor or beverage holder. Valve 22 (FIG. 2) helps in purging and cleaning of tubes inside dispensers.

Figure 2:
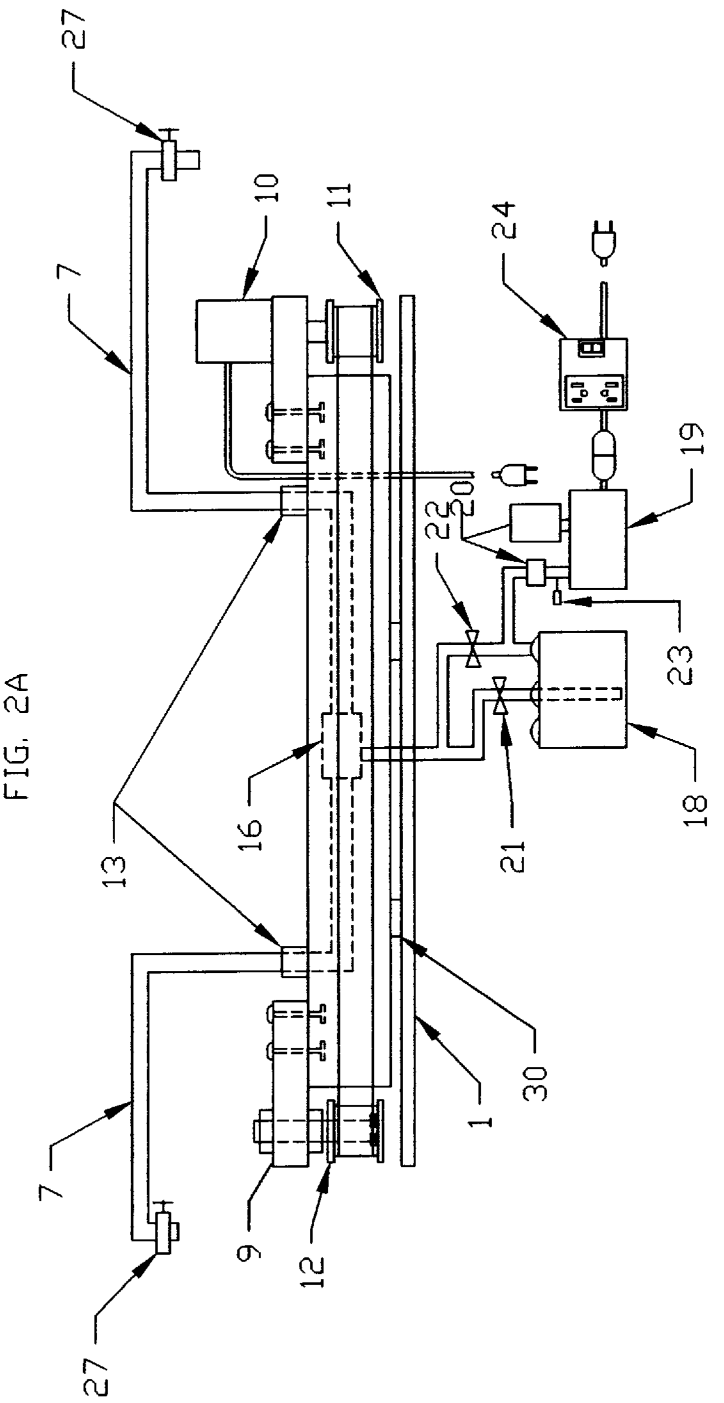
FIG. 2 shows an elevation view of the assembly without enclosure.

Now referring to FIG. 2, main body of conveyor is made of aluminum extrusion. Mounted on them are motor and idler pulley brackets. Pulleys are flanged to help in guiding of flat belt which is driven by a geared motor 10 and powered by a variable speed controller 24 which also has a voice activated enable/disable to start and stop conveyor and a selector to keep motor on continuously if desired.

Figure 3:
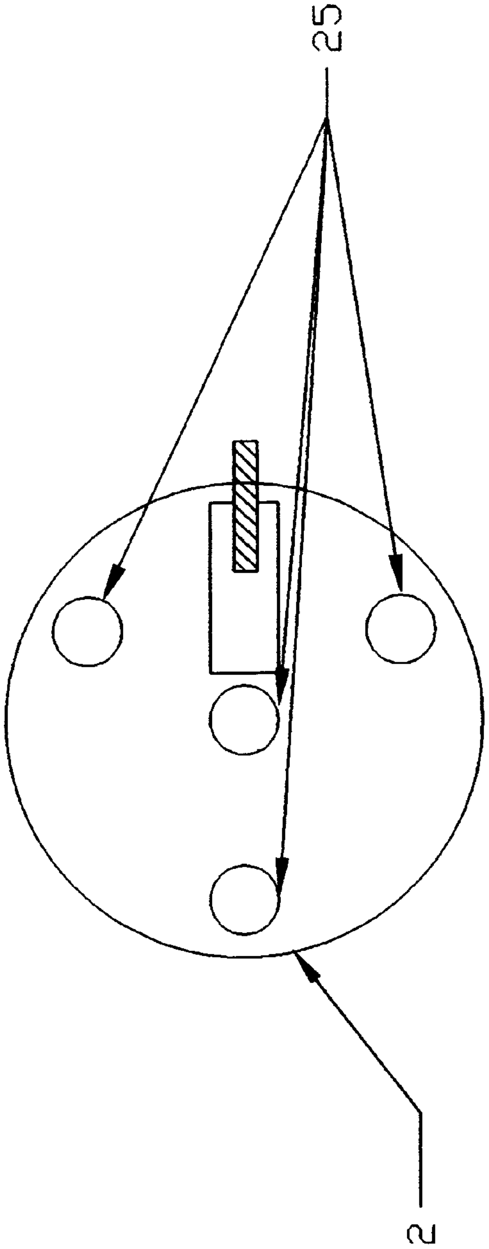
FIG. 3 illustrates bottom view of serving bowl holder plate.
Figure 5:
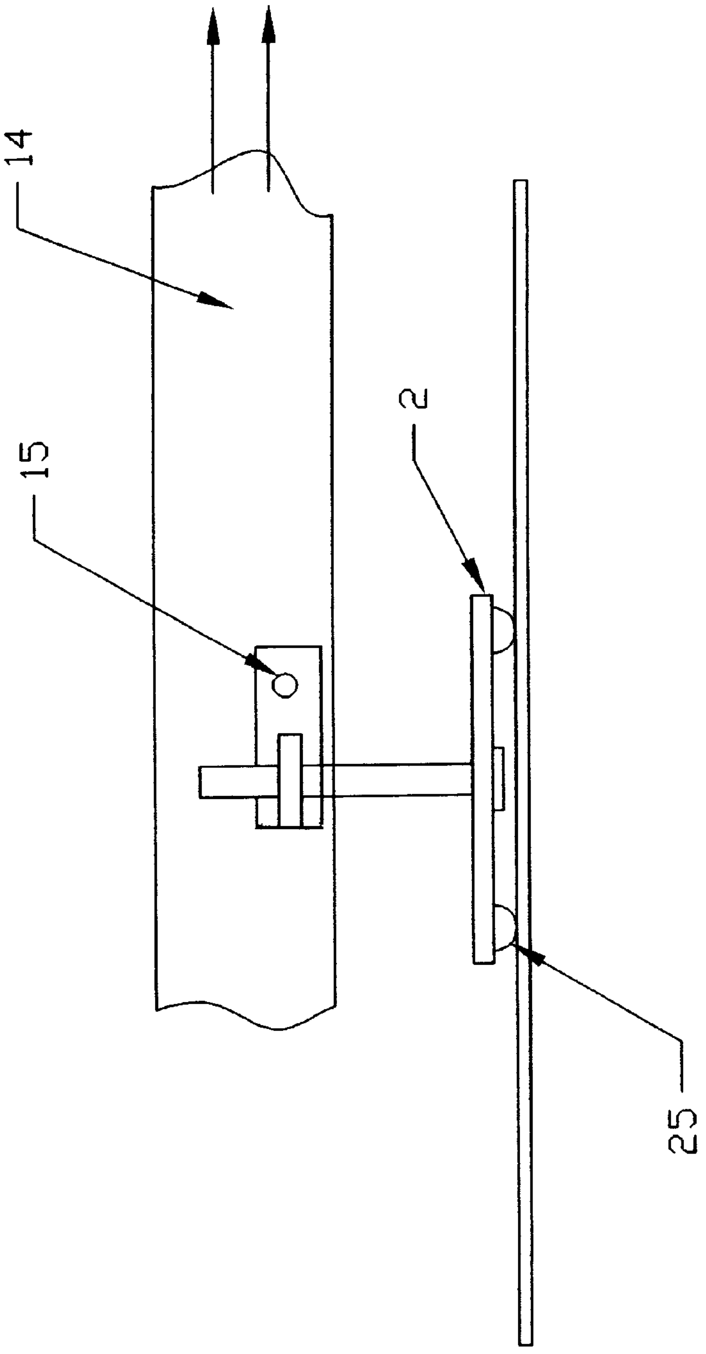
FIG. 5 shows how conveyor hook is engaged with plurality of serving bowl holder plate.

FIGS. 3 and 3A are detailed drawings of serving bowl holder plate 2. These are made of cork top and reinforced by a wooden piece below. Into the wooden piece is screwed low friction blocks 25 and bracket 26. This bracket engages with hook 15 as illustrated in FIG. 5.

Figure 4A:
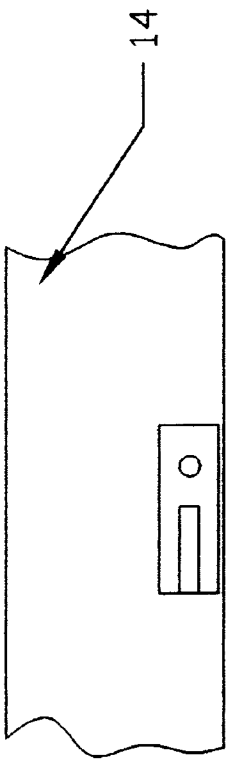
FIG. 4A is top view of flat conveyor belt hook assembly.
Figure 4:
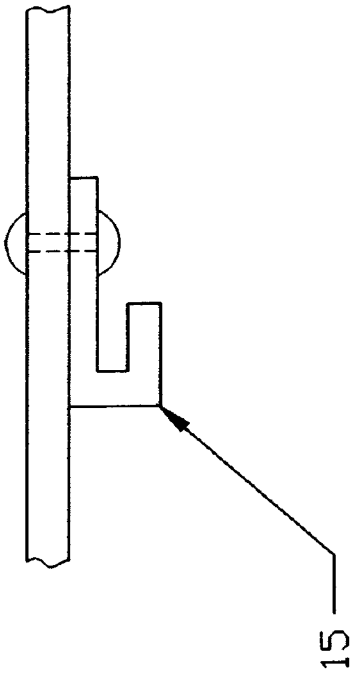
FIG. 4 is elevation of flat conveyor belt hook assembly.

FIG. 4 gives a detailed description of hook to conveyor which are riveted together.

I claim:

1. Dining table top conveyor comprising:

A. Variable speed controlled gear motor driven flat belt with voice activated start/stop enable/disable or continuous operation selectable.

B. Flat belt with special hook device riveted, so as to be able to go around the pulley.

C. Plurality of serving bowl holder plate attached to conveyor hook by a bracket device to enable it to go around the pulley, also these have low friction blocks on under side to slide around the conveyor with minimum horizontal force, these have cork top to with stand hot serving bowls and grip to hold the bowls without any clamps.

D. Base unit is a flat, scratch proof tough plastic sheet laying freely on top of a dining table of shape to match the dining table.

E. Beverage dispensing unit with a 330 degrees swivel and telescopic in/out travel and supplied by a pressurized tank installed under the dining table, also under the table is a mini compressor supplying filtered air and controlled by a pressure switch.

F. Esthetically made plastic molding cover with sound proof lining on inside to reduce motor noise and attachments for napkin holder, cutlery holder, and condiments holders to form a part of dining room decor.

2. Dining room table top conveyor set forth in claim 1 has a moving belt, driving serving bowl holders with low friction blocks and without a pathway.

3. Dining room table conveyor set forth in claim 1 is light in construction and esthetically made, more specifically for dining tables of all types in homes, hotels and where dining tables are used.

4. Beverage dispencing unit set forth in claim 1 is swivel and in/out movement type with drip proof push valve.

* * * * *